United States Patent [19]

Linderholm

[11] Patent Number: 4,898,218

[45] Date of Patent: Feb. 6, 1990

[54] DELIMBING DEVICE FOR A TREE

[75] Inventor: Stig Linderholm, Grangärde, Sweden

[73] Assignee: Grangärde Maskin AB, Grangärde, Sweden

[21] Appl. No.: 360,317

[22] Filed: Jun. 2, 1989

[30] Foreign Application Priority Data

Jun. 6, 1988 [SE] Sweden ............................... 8802098

[51] Int. Cl.[4] ................................................ B27L 1/00
[52] U.S. Cl. .................................... 144/2 Z; 144/343;
144/357
[58] Field of Search .................... 144/2 Z, 3 D, 34 R,
144/336, 338, 343, 357

[56] References Cited

U.S. PATENT DOCUMENTS 4,412,569 11/1983 Barnett et al. ...................... 144/2 Z Primary Examiner—W. Donald Bray
Attorney, Agent, or Firm—Robert G. Mentag

[57] ABSTRACT

In a delimbing device for a tree processing apparatus (10), comprising a pair of curved gripping means (22, 26) provided with limbing knives (24, 28) and adjustable by actuator means (44, 46) for supporting and delimbing a peripheral section of a tree trunk movable in the longitudinal direction and preferably towards the top end thereof relative to the gripping means, and comprising an additioinal limbing knife (36) movably biassed against the tree trunk for delimbing a remaining peripheral section thereof, there is suggested, in order to maintain the close contact of the limbing knives around the trunk during the limbing operation, that position sensor means (64) are arranged to emit a signal for adjustment of said actuator means (44, 46) to change the amount of closing of said gripping means (22, 26) and to thereby change the position of the tree trunk in the processing apparatus (10), each time a section of the trunk facing the additional limbing knife (36) has been displaced a predetermined distance in the direction of movement of the additional limbing knife (36).

4 Claims, 1 Drawing Sheet

U.S. Patent  Feb. 6, 1990  4,898,218
FIG.1
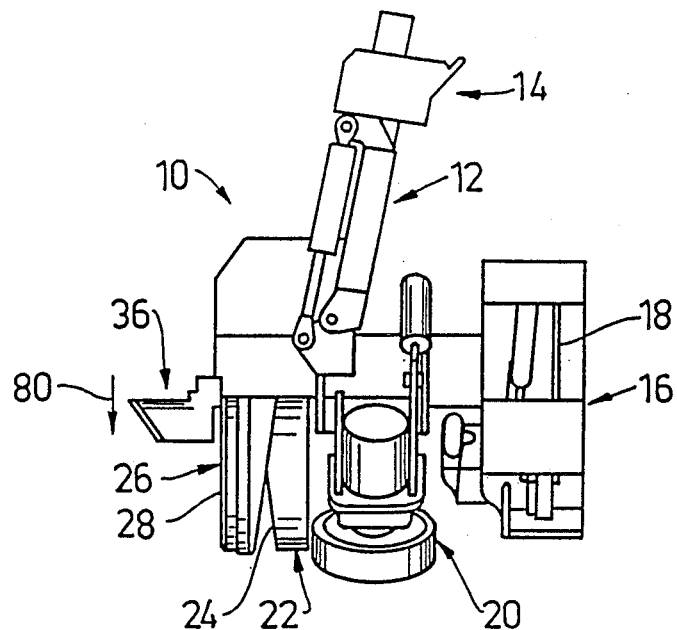
FIG.2
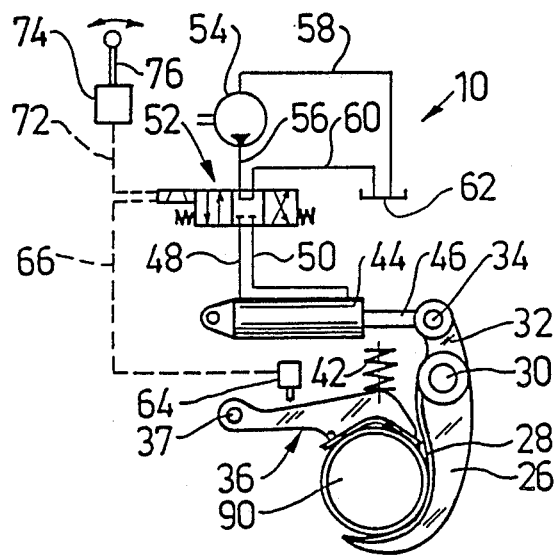
FIG.3

DELIMBING DEVICE FOR A TREE

This invention relates to a delimbing device as defined in the precharacterising part of the appended claim 1.

Felling heads or tree processing assemblies are known to be provided with a separate or third limbing knife which is movably forced against the tree trunk by a spring, thereby making it possible to remove all branches round the trunk at the longitudinal movement thereof relative the separate limbing knife and the other limbing knives provided on the gripping means.

When the diameter of the tree trunk decreases during its delimbing movement through a processing apparatus of this type, inevitably also the spring force decreases, resulting in that the close contact of the limbing knives around the tree trunk is deteriorated so that also the quality of work is deteriorated. Indeed the operator might be able to compensate for the diameter reduction by gradually closing the gripping means during the limbing operation, but this requires great attention to the process.

An object of the present invention is therefore to eliminate this problem in a simple manner by providing a delimbing device of the kind as indicated above which relieves the operator from the concentration demanding and tiresome work of continuously watching and adjusting the delimbing operation.

This object is achieved by the features given in the characterising part of claim 1.

According to a preferred embodiment of the invention, the delimbing device is provided with a position sensor means arranged to emit a signal for adjustment of the means actuating the gripping means so that the tree trunk is lifted further up in the processing assembly each time an upper face of the trunk has been lowered a predetermined distance in the assembly due to the diameter reduction during the delimbing operation.

If the position sensor means is arranged to detect a lowering or a displacement of a member normally following the upper face of the trunk, such as the separate limbing knife or a length measuring wheel, there is provided a particularly simple embodiment which at a relatively low cost can be later installed on existing processing assemblies. The position sensor means can preferably comprise a limit switch arranged to close an electric circuit for adjustment of the actuating means when said member has been lowered the predetermined distance and to disconnect said electric conduit and stop said adjustment when said member via the tree trunk has been returned a corresponding distance by the gripping means.

These and other objects and features of the invention will now be described with reference to the accompanying drawings, in which:

FIG. 1 shows an example of a tree processing assembly which can be provided with a delimbing device according to the invention;

FIG. 2 is a diagrammatic view of an embodiment of the invention; and,

FIG. 3 is a diagrammatic view of a part of an alternative embodiment of the invention.

With reference to FIG. 1, there is shown a tree processing assembly or a felling and processing head 10 known per se and adapted for connection, through a link mechanism 12 and a rotator 14, to a boom end of a vehicle (not shown) carrying the assembly. The assembly 10 is in a way known per se manner further provided with a cutting unit 16 having a swingable chain saw blade 18, a pair of opposed trunk-feeding units 20 (only one is shown), and a gripping and delimbing device comprising a pair of trunk-grippers 22 and 26 having respective limbing knives 24 and 28 and comprising a separate limbing knife 26. Limbing knives 24, 28, 36 together enclose substantially completely the periphery of a tree trunk received in the processing assembly 10, so that all branches thereof will be cut off when the tree trunk is fed from left to right through the assembly 10 in FIG. 1.

For allowing the separate or upper limbing knife 36 to follow the diameter variations of the trunk during the limbing operation, the limbing knife 36 is arranged movable and resiliently forced in the direction of arrow 80 in FIG. 1.

FIG. 2 shows diagrammatically an example according to the invention of an arrangement which is capable of automatically increasing the amount of closing of the grippers in dependence of the reducing diameter of the trunk during the limbing operation, so that the close contact of the grippers around the tree trunk can be maintained in a substantially uniform manner, independent of said diameter reduction.

In the example shown on FIG. 2, one, 26, of the grippers is shown pivotally connected to a piston rod 46 of a hydraulic cylinder 44 through a stationary pivot joint 30 and a lever arm 32. The other gripper 22 (shown in FIG. 1 but not shown in FIG. 2 for the sake of clarity) is in a corresponding way also connected to a piston rod of a respective hydraulic cylinder through a stationary pivot joint and a lever arm (not shown). Each cylinder 44 is in turn via conduits 48, 50 and a preferably common, electrically controlled 4 way directional valve 52 connected to a drive assembly including a pump 54, a sump 62 as well as supply and return conduits 58 and 60, respectively. For controlling the directional valve 52 there is provided a control unit 74 having a control lever 76 which, via a signal line 72, in a manner known per se is adapted to emit signals for controlling the valve 52.

The separate limbing knife 36 is at one end pivotably mounted in a pivot joint 37 and forced by a spring 42 towards the upper peripheral portion of a tree trunk 90 held by the processing assembly. With reference to FIG. 2, a limit switch 64 above the separate limbing knife 36 is adapted to be actuated or switched when contacted by the movable separate limbing knife 36. Limit switch 64 is preferably of the mono stable type, such as a micro switch which, when not actuated during the limbing operation, is arranged to conduct current through a signal line 66 and thereby to hold the valve 52 in a position for closing the grippers 22, 26. When actuated by the separate limbing knife 36, the limit switch 64 is arranged to switch off the current through the signal line 66 and thereby to allow the valve 52 to return to its closed neutral position shown in FIG. 2, stopping the closing movement of the grippers 22, 26.

The arrangement shown in FIG. 2 is intended to operate in substantially the following manner.

Before a delimbing operation, the butt end of the tree trunk is assumed to be received in the processing assembly 10. The grippers 22, 26 have such a configuration that by the continuing closing motion thereof, which is initiated by limit switch 64 and/or control lever 76, the tree trunk 90 is lifted higher and higher up in the processing assembly 10. When the separate limbing knife 36 is raised by the tree trunk 90 to engagement with the resilient contacting member of the limit switch 64 and moves it past the switching point thereof, the valve 52 returns to its neutral position so that the closing movement of the grippers 22, 26 is interrupted. When the diameter of the section of the tree trunk 90 located between the limbing knives is reduced during the longitudinal movement of the trunk towards the top end thereof, the separate limbing knife 36 is returned in correspondence thereto by the spring 42. Now also the contacting member of the limit switch 64 is resiliently returned. When the contacting member moves past the switching point of the limit switch, the valve 52 is again brought to its operative position for renewed closing of the grippers 22, 26 and lifting of the tree trunk in the processing assembly until the limit switch is again actuated. This is repeated until the delimbing operation is completed.

FIG. 3 shows diagrammatically an alternative embodiment, where the limit switch 64 in a corresponding manner is arranged to be actuated by an arm 82 being pivotably mounted to the processing assembly and resiliently forced against the tree trunk 90, and having mounted, at the free end thereof, a roller or wheel 80, such as a length measuring wheel, rolling along the tree trunk 90.

The control line of or the signals from the control unit 74 arranged to close the grippers 22, 26 and the control line 66 of the switch 64, can for example be connected to an AND gate (not shown), so as to allow the switch 64 to enter into function only when also the control lever 76 is actuated for closing the grippers.

While not shown or described, there is in the scope of the appended claims also possible to detect, for example by means of an additional sensor means, a temporary or permanent diameter increase of the tree trunk and in dependence thereof to reduce the amount of closing of the grippers during the limbing operation.

I claim:

1. A delimbing device for a tree processing apparatus (10), comprising:
    (a) a pair of curved gripping means (22,26) which are each provided with a limbing knife (24,28), for supporting and delimbing a peripheral section of a tree trunk movable in the longitudinal direction thereof relative to the gripping means;
    (b) actuator means (44,46) operatively connected to said gripping means (22,26) and limbing knives (24,28) for adjusting the same relative to the tree trunk;
    (c) an additional limbing knife (36) pivotally mounted on said device;
    (d) means (42) for resiliently forcing said additional limbing knife (36) against the tree trunk for delimbing a remaining peripheral section thereof; and,
    (e) a position sensor means (64) constructed and arranged to detect a displacement of a member (36,82), transverse to said longitudinal direction, following said remaining peripheral section of the tree trunk, and to emit a signal to make an adjustment of said actuator means (44,46) to change the amount of closing of said gripping means (22,26) and to thereby change the position of the tree trunk in the processing apparatus (10), each time a section of the trunk facing the additional limbing knife (36) has been displaced a predetermined distance in the direction of movement of the additional limbing knife (36).

2. The delimbing device as defined in claim 1, including:
    (a) an electrically controlled adjustment means (44,52) having an electric control circuit (66); and,
    (b) said position sensor means (64) comprises a limit switch actuatable by said member (36,82) to close an electric circuit for initiating said adjustment of the actuator means (44,46) when said member (36,82) has been displaced a distance corresponding to said predetermined distance, and to disconnect said electric circuit and stop said adjustment when said member (36,82) via said trunk has been returned substantially said distance by the gripping means (22,26).

3. The delimbing device as defined in either claim 1 or claim 2, in which:
    (a) said member is the additional limbing knife (36).

4. The delimbing device as defined in either claim 1 or claim 2, in which:
    (a) said member is a pivotally mounted arm (82) which is resiliently forced against the tree trunk.

* * * * *